Patented Apr. 25, 1950

2,505,645

UNITED STATES PATENT OFFICE 2,505,645

HYDROXYLATED ALPHA,BETA-DIPHENYL-BETA-HYDROXY-ETHYLAMINES AND THE PREPARATION THEREOF

Warren D. McPhee, Castleton on Hudson, N. Y., assignor, by mesne assignments, to Winthrop-Stearns Inc., New York, N. Y., a corporation of Delaware No Drawing. Application October 18, 1945, Serial No. 623,173

8 Claims. (Cl. 260—570.6)

This invention relates to $\alpha,\beta$-diphenyl-$\beta$-hydroxyethylamines and salts thereof, wherein the $\beta$-phenyl nucleus is substituted with hydroxy radicals, and to methods of preparing the same. In particular it relates to $\alpha$-phenyl-$\beta$-(4-hydroxyphenyl)-$\beta$-hydroxyethylamine and salts thereof, and to processes of preparing the same.

The object of this invention is to provide new compositions of matter which are therapeutically useful due to their valuable analgesic properties. A further object of this invention is to provide new medicinal preparations having analgesic action suited for treatment of humans and animals.

In general, the new compositions which are the basis of this invention are $\alpha,\beta$-diphenyl-$\beta$-hydroxyethylamines wherein the $\beta$-phenyl nucleus is substituted with hydroxyl radicals, having the following general formula:

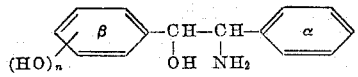

where $n$ is 1 to 2 inclusive, and salts thereof. A preferred specific embodiment of the invention comprises an $\alpha$-phenyl-$\beta$-hydroxyphenyl-$\beta$-hydroxyethylamine, particularly the compound wherein the hydroxyl group in the $\beta$-phenyl nucleus is in the 4- or para-position, and having the following formula:

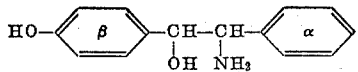

In a preliminary survey Dodds, Lawson and Williams [Nature, 151, 614 (1943); Proc. Roy. Soc. (London), B, 132, 119 (1944)] reported that $\alpha,\beta$-diphenyl-$\beta$-hydroxyethlamine and certain homologs thereof relieve pain due to pressure on the nerves of humans with inoperable tumors. In a later note by the same workers [Nature, 154, 514 (1944)] it is stated that $\alpha,\beta$-diphenyl-$\beta$-hydroxyethylamine and related compounds previously tested clinically are entirely devoid of analgesic activity when tested by the electric shock method on rats. The compounds which had been used clinically have a specific action on nerve pressure pain, but no general analgesic effect. The series of $\alpha,\beta$-diphenyl-$\beta$-hydroxyethylamines tested by the English workers did not, however, include those in which the $\alpha$-phenyl radical is unsubstituted and in which the $\beta$-phenyl radical is substituted with one or more hydroxyl groups.

I have discovered that $\alpha$-phenyl-$\beta$-(hydroxyphenyl)-$\beta$-hydroxyethylamines and salts thereof produce general analgesia in humans and animals. This discovery is surprising in light of the disclosure of Dodds, Lawson and Williams [Nature, 154, 514 (1944)] that $\alpha,\beta$-diphenyl-$\beta$-hydroxyethylamine and related compounds have no universal analgesic action and cannot be used generally as substitutes for morphine.

The amines which are the basis of this invention may be employed either in the form of the free bases or in the form of salts. For parenteral administration it is desirable that the compositions be soluble in water. For this purpose the hydrochlorides of the bases are suitable. Other acids may be used in preparing salts of the amines, among them being sulfuric, citric, lactic and tartaric. The term "salts" is used herein to include any salt of an $\alpha,\beta$-diphenyl-$\beta$-hydroxyethylamine, wherein the $\beta$-phenyl nucleus is hydroxylated, with any acid, the anion of which is tolerated in therapeutic dosages.

The method of preparing $\alpha$-phenyl-$\beta$-hydroxyphenyl-$\beta$-hydroxyethylamines is outlined in the following series of equations and illustrated in the appended examples. It will be apparent to those skilled in the art that a number of other substituted phenols may be used in the reaction without departing from the spirit and scope of my invention.

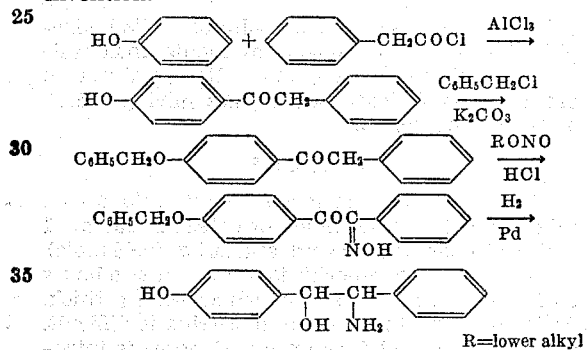

R=lower alkyl

The following examples are merely illustrative and in no way limit my invention.

Example 1

(A) *Benzyl p-hydroxyphenyl ketone.*—This is prepared by heating and stirring 12.2 g. (0.13 mole) of phenol, 37 g. (0.28 mole) of aluminum chloride, 100 cc. of nitrobenzene and 17.2 cc. (0.13 mole) of phenylacetylchloride at 80–90° C. for ninety minutes. The cooled reaction mixture is poured into 300 cc. of ice water containing 10 cc. of concentrated hydrochloric acid. The product is isolated by extraction with ether followed by extraction with dilute sodium hydroxide solution and acidification. The yield is 16.8 g. (61%) of tan solid, M. P. 139–142° C. with sintering from 132° C. [Cf. Weise, Monatsh., 26, 986 (1905)]

(B) *Benzyl p-benzyloxyphenyl ketone.*—164 g. (0.774 mole) of the product shown in Example 1(A) is benzylated by refluxing and stirring with 98 cc. (0.852 mole) of benzyl chloride, 57.6 g. (0.542 mole) of sodium carbonate, 6.44 g. (0.039 mole) of potassium iodide and 800 cc. of 95% alcohol for eight hours. On cooling, the mass solidifies. The product is filtered, washed with water and alcohol and dried. The yield is 205 g. (88%) of ketone, M. P. 136–137° C. Calculated for $C_{21}H_{18}O_2$: C, 83.42; H, 6.00. Found C, 83.66; H, 5.86.

(C) *α-isonitrosobenzyl p-benzyloxyphenyl ketone.*—A suspension of 10 g. of the ketone prepared in Example 1(B) is nitrosated in 200 cc. of refluxing dry ether by slow addition of a large excess of amyl nitrite (10 cc.) and dry, gaseous, hydrogen chloride. The nitrosated product is soluble in ether and is readily separated from the starting material by filtration. The filtrate is treated with two volumes of petroleum ether of B. P. 60–90° C. and 5.5 g. (51% yield) of the isonitrosoketone crystallizes out; M. P. 126–127° C., with sintering from 122° C. Recrystallization from benzene raises the M. P. to 131–132° C. Calculated for $C_{21}H_{17}O_3N$: N, 4.23. Found N, 4.21.

(D) *α-Phenyl-β-(4-hydroxyphenyl)-β-hydroxyethylamine hydrochloride.*—A suspension of 23 g. (0.07 mole) of the isonitroso ketone in 150 cc. of methanol is reduced in the presence of palladium-on-charcoal catalyst at 55° C. and 50 lbs./sq. in. hydrogen pressure. After three moles of hydrogen are absorbed, 12 cc. (0.07 mole) of 5.8 N alcoholic hydrogen chloride is introduced and hydrogenation is continued until a fourth mole is taken up. The reduction requires about twenty-one hours. The solution is filtered and concentrated by evaporation in vacuo. The addition of ether yields 11.4 g. (62%) of white crystalline amine hydrochloride, M. P. 186–187° C. (decomp.). Calculated for $C_{14}H_{16}O_2NCl$: N, 5.27. Found: N, 5.00.

(E) *α-Phenyl-β-4-hydroxyphenyl-β-hydroxyethylamine* may be obtained from its hydrochloride by treating an aqueous solution of its hydrochloride with dilute aqueous ammonia until basic and removing the precipitate. Recrystallization from methanol yields the free base, having a M. P. greater than 235° C.

Example 2

(A) *Benzyl 3,4-dihydroxyphenyl ketone.*—A mixture of 110 g. (1 mole) of catechol, 136 g. (1 mole) of phenylacetic acid, and 101 g. (0.66 mole) of phosphorus oxychloride is stirred for two hours at 90–100° C. at the end of which time a thick, dark brown paste results and stirring is difficult. Two hundred and fifty grams of water is introduced and the mixture refluxed for an hour. Upon cooling, the red-brown oil forms a red-orange solid. This is washed with hot benzene and dried. The yield is 134 g. (59%); M. P. 168–170° C., with sintering from 162° C. [Cf. Finzi, Monatsh., 26, 1133 (1905)]

(B) *Benzyl 3,4-dibenzyloxyphenyl ketone.*—The benzylation is carried out as in Example 1(B), using 130 g. (0.57 mole) of the dihydroxy ketone, 159 g. (1.25 mole) of benzyl chloride, 170 g. (1.6 mole) of sodium carbonate, 4.7 g. (0.03 mole) of potassium iodide, and 500 cc. of alcohol. Recrystallization from alcohol affords 153 g. (66% yield) of product, M. P. 91.5–93° C. A second recrystallization gives M. P. 92.5–93° C. Calculated for $C_{28}H_{24}O_3$: C, 82.33; H, 5.92. Found: C, 82.39; H, 5.83.

(C) *α-Isonitrosobenzyl 3,4-dibenzyloxyphenyl ketone.*—The nitrosation is similar to the previous one shown in Example 1C except that excess gaseous methyl nitrite is used. Streams of gaseous methyl nitrite and hydrogen chloride are passed into a suspension of 15 g. (0.037 mole) of ketone in 250 cc. of dry ether for forty minutes during refluxing. The isonitroso ketone is recrystallized from methanol; yield, 12 g. (75%); M. P. 138–139° C., with shrinking from 136° C. Calculated for $C_{28}H_{23}O_4N$: N, 3.20. Found: N, 3.19.

(D) *α-Phenyl-β-(3,4-dihydroxyphenyl)-β-hydroxyethylamine hydrochloride.*—Twelve grams (0.0275 mole) of the isonitroso ketone is reduced in 150 cc. of 67% aqueous methanol containing an equivalent of hydrochloric acid, in the presence of palladium-on-charcoal catalyst. Debenzylation and reduction of the isonitrosogroup proceeds at room temperature. The ketone is reduced at 55° C., the total time being ten hours. The solution is filtered and evaporated to dryness. Recrystallization from benzene-ethanol yields 3.1 g. (43%) of white crystals, M. P. 172–173° C. (decomp.). Calculated for $C_{14}H_{16}O_3NCl$: N, 4.97. Found: N, 4.89.

What I claim is

1. An *α,β*-diphenyl-*β*-hydroxyethylamine wherein the *β*-phenyl nucleus contains one to two hydroxyl groups, and salts thereof.

2. An *α*-phenyl-*β*-monohydroxyphenyl-*β*-hydroxyethylamine and salts thereof.

3. *α*-Phenyl-*β*-4-hydroxyphenyl-*β*-hydroxyethylamine and salts thereof.

4. An *α*-phenyl-*β*-dihydroxyphenyl-*β*-hydroxyethylamine and salts thereof.

5. *α*-Phenyl-*β*-(3,4-dihydroxyphenyl)-*β*-hydroxyethylamine hydrochloride.

6. *α*-Phenyl-*β*-4-hydroxyphenyl-*β*-hydroxyethylamine hydrochloride.

7. A process of preparing an *α*-phenyl-*β*-hydroxyphenyl-*β*-hydroxyethylamine which comprises catalytically reducing an alpha-isonitrosobenzyl benzyloxyphenyl ketone.

8. A process of preparing *α*-phenyl-*β*-4-hydroxyphenyl-*β*-hydroxyethylamine which comprises catalytically hydrogenating alpha-isonitrosobenzyl 4-benzyloxyphenyl ketone.

WARREN D. McPHEE.

REFERENCES CITED

The following references are of record in the file of this patent:

UNITED STATES PATENTS

| Number | Name | Date |
|---|---|---|
| 1,965,502 | Legerlotz | July 3, 1934 |

FOREIGN PATENTS

| Number | Country | Date |
|---|---|---|
| 313,617 | Great Britain | July 24, 1930 |

OTHER REFERENCES

Chemical Abstracts, vol. 26 (1932), page 4042.

Wilson et al., J. Chemical Society (1935), pages 1120–1123.

Taylor et al., "Sidgwick's Org. Chem. of Nitrogen" (Oxford Univ. Press, 1937), page 171.

Degering, "An Outline of Org. Chem." (Barnes and Noble, 1941), pages 39 and 188.

Thomas, "Anhydrous Aluminum Chloride in Organic Chemistry," (Reinhold Pub. Co. 1941), pages 213–214.

Dodds et al., "Proc. Roy. Soc. (London) vol. B132, pages 119–132 (1944).

Adkins, "Reactions of Hydrogen" (Univ. of Wis. Press, Madison, Wis. 1946), pages 133–134.